United States Patent [19]
Harrison et al.

[11] 3,856,706

[45] Dec. 24, 1974

[54] HIGH SURFACE AREA SILICEOUS SUPPORT

[75] Inventors: Henry F. Harrison, Chattanooga, Tenn.; Moses P. Davis, Jr., White Bear Lake, Minn.

[73] Assignee: Minnesota Mining and Manufacturing Company, St. Paul, Minn.

[22] Filed: June 8, 1972

[21] Appl. No.: 261,061

[52] U.S. Cl............. 252/450, 252/455 R, 252/457, 252/460, 252/477 R
[51] Int. Cl...... B01j 11/32, B01j 11/40, B01j 11/58
[58] Field of Search........ 252/455 R, 457, 460, 450, 252/477 R; 423/132, 628

[56] References Cited
UNITED STATES PATENTS

| | | | |
|---|---|---|---|
| 2,656,398 | 10/1953 | DeVault........................ | 252/460 X |
| 2,974,054 | 3/1961 | Beamesdefer et al. ......... | 252/450 X |
| 3,458,393 | 7/1969 | Battista.......................... | 252/450 X |

*Primary Examiner*—C. Dees
*Attorney, Agent, or Firm*—Alexander, Sell, Steldt & DeLaHunt

[57] ABSTRACT

A high specific surface area silica for support of e.g., platinum catalysts is obtained by acid leaching of a ceramic, particularly a corrugated structure, containing a cordierite phase.

12 Claims, No Drawings

HIGH SURFACE AREA SILICEOUS SUPPORT

This invention relates to a siliceous composition having high specific surface area, to a process for making it and to catalysts obtained by deposition of catalytic compositions thereon.

Legislation requiring a substantial reduction and possible elimination of harmful and noxious vapors and particulates from the exhaust gas of automobiles powered by internal combustion engines has caused a considerable rejuvenation of interest in the use of catalytic systems for the purification of exhaust gases and renewed efforts to lower engine emission levels. A particularly attractive method for reducing the polluting effects of exhaust gases is by catalytic conversion using a monolithic ceramic structure upon which an appropriate catalyst is chemically deposited. A monolithic ceramic is desirable as opposed to a particulated catalyst support because of low pressure drop per unit area, high temperature stability, chemical resistances, ease of packaging, high surface area to weight ratio, absence of attrition caused by vibration and ease of processing.

A convenient type of monolithic ceramic for use in catalytic devices is a corrugated ceramic as used in U.S. Pat. Nos. 3,079,273; 3,088,271; 3,109,715; 3,134,457 and many others. The corrugated ceramic structures are formed according to U.S. Pat. No. 3,444,925 from continuous ribbons of flexible unfired ceramic greensheets which are suitably made utilizing conventional Foudrinier papermaking equipment as described in K. E. Owens and R. A. Hatch, U.S. Pat. No. 3,458,329. The greensheets are subsequently given a sinusoidal structure by corrugating rolls and set in that configuration by glueing a flat greensheet to the ridges of the corrugations using as a glue medium a material firing to a ceramic bond between the adjacent layers. Pieces of the composite green ceramic sheet formed of flat and corrugated layers and be further joined using the same glue medium on contact points. A monolithic structure of the desired size and shape is formed, cutting as needed in the green form, and then fired at a high temperature to give a monolithic ceramic structure. The cellular nature of the structure is determined by the individual cell size and configuration and the thickness of the ceramic web after firing. Monolithic ceramic structures of this type are readily available with 2 to 36 cells (corrugations) per 25 mm. and web thicknesses from 0.01 to 0.05 mm. or more depending on the cell dimensions. The percent open area of such structures is approximately 60 to 85% and thus they provide very low resistance to gas flow and, hence, low pressure drop.

Monolithic ceramics such as the corrugated structures described above are useful as catalyst supports for the reasons already stated; but as produced, for example from a composition of about 65–75% cordierite, 15–25% alumina and 10–15% mullite, lack in specific surface area which is likely to be less than 0.1 m²/gm rather than the 10 to 100 m²/gm or higher which is desirable. Some catalyst support materials, such as gamma alumina pellets which are widely used in the chemical and food processing industries, typically have specific surface areas in the range of 200 to 350 m²/gm., but such structures have inherent disadvantages in applications where pressure drop must be kept low and attrition cannot be tolerated.

One method for increasing the specific surface area of ceramic structures is by application of an aqueous sol of alumina trihydrate at various concentration levels followed by conversion to gamma alumina. Thus samples of the above corrugated ceramic structures comprising principally the compound cordierite are treated with various amounts and concentrations of alumina trihydrate by spraying, pouring, or dipping, followed by drying in flowing air and subsequent firing in air at 500° to 600° C. to form stable gamma alumina coatings on the surfaces. Suitable sol concentrations are 10 to 20 wt.% of $Al_2O_3$ in water and the products will generally exhibit specific surface areas of the alumina coated cordierite ceramic structure of from 5 to 20 m²/gm with weight gains of 2 to 10%. These coated structures are treated to deposit catalytically active metals such as platinum or, alternatively, the catalyst material, either a platinum group metal or an oxide catalyst, can be incorporated into the sol and co-deposited on the support structure. The catalytic shapes are very useful but possess certain major disadvantages.

High surface area coatings, either of the sol type or fine grain size powder dispersions, suffer from a serious handicap which contributes to poor catalyst effectiveness and decreased durability in service, namely the coatings tend to spall, flake and crack with repeated cycling to temperatures above 600° C. due to the differences in thermal expansion coefficients between the support and the coating. Furthermore, the coating is of such very fine grain size that it is very reactive and begins to shrink and densify at temperatures in the 600° to 800° C range. As the average particle size becomes smaller, the surface area is increased and the tendency to densify at elevated temperatures is also increased because the driving force for this action is the lowering of surface energy. These same driving forces are responsible for the reduction of specific surface area and the resultant densification and shrinkage of pelletized gamma alumina catalyst supports at elevated temperatures.

It is an aim and object of this invention to provide new catalyst supports and particularly catalyst supports having low resistance to gas flow and high specific surface area. Other aims and objects will become apparent hereinelsewhere.

In accordance with these and other objects of the invention, it has been found that the mineral species cordierite which is often employed in or may be present in ceramic constructions at from a few percent such as about 5% up to 100% is quite readily leached by strong acids, both organic and inorganic, which form soluble magnesium and aluminum salts to leave a siliceous skeletal structure having unusually useful properties as a catalyst support. The process of the invention is illustrated hereinbelow with particular reference to monolithic corrugated structures comprising about 65–75% cordierite but it will be understood that it is also applicable to objects comprising cordierite in both crystalline and glassy forms in sufficiently thin sections and sufficiently open that leaching can be achieved. Although a thin surface layer of massive cordierite may be leached, it is relatively difficult to achieve a useful degree of specific surface area.

Application of the process of the invention to a monolithic cordierite ceramic structure of the type described above in addition to the desirable normal attributes of geometric structure, thermal stability, chemical inertness and other known properties, high specific surface area without the disadvantages associated with coatings and/or fine grain size particulate structures. In addition to achieving specific surface areas of 10 to 100 m²/gm, the total porosity of the corrugated ceramic support is increased from a nominal 30% by volume to approximately 40% by volume. The pore size distribution is substantially altered to enhance the catalytic effectiveness by providing an abundance of very large pores (1 to 50μ) with a substantial volume of very small pores (0.001 to 0.1μ). Catalytically, this presents an ideal surface structure in that the gaseous molecules which one desires to react catalytically are exposed to large surface areas and thus catalyst reaction sites, but are relatively free to diffuse in and out of the structure undeterred by small diameter passages and channels. Maximum inward diffusion of reactants into the structure and to the catalyst is possible, as is the outward diffusion of the reaction products.

Because the improved catalyst support structure contains no high surface area coating, the catalyst, of whatever type such as noble metal or oxide type, is chemically attached directly to the support surface. Because the amount of catalyst employed is, in the case of noble metals a small fraction (less than 1% by weight) the catalyst is extremely thin, no spalling and cracking occur, and the physical stability is improved. It is also possible to use these catalyst supports with a high surface area coating if desired and they are found to be superior for that purpose to unleached supports.

As indicated, the process of the invention is essentially an acid leaching of a cordierite structure. It is preferred that the cordierite structure be in its desired geometrical shape but some modification can be made subsequent to the treatment provided that it does not involve an operation which tends to plug the open structure produced or to sinter the siliceous skeleton.

The structure may comprise any percentage of cordierite initially although it is preferred that it comprise at least 30% and up to 100% by weight of cordierite. The structure must be open and should have at least 10-20% and preferably more open space by volume. The maximum will, of course, be determined by the compressive strength needed. An open space of 25-40% is considered a good compromise between the extremes and is preferred. Individual parts may be relatively thick but it is preferred that much of the structure have thin cross-section of ceramic so that leaching is not excessively protracted. It will be recognized that the process is also applicable to cordierite structures which are relatively massive and may be affected solely on external surfaces.

Leaching is carried out using any strong mineral or organic acid which possesses soluble magnesium and aluminum salts. Nitric acid and oxalic acid are particularly useful and they are used at concentrations usually of at least 10% by weight and preferably more. These dilute solutions will require replenishment as the acid is exhausted. Other acids which can be used include hydrochloric, hydrobromic, sulfuric, phosphoric, toluenesulfonic, formic, trichloracetic, trifluoromethane sulfonic, perchloric and other acids generally having a dissociation constant greater than about $1 \times 10^{-5}$ and preferably greater than $5 \times 10^{-4}$. Hydrofluoric acid will attack the silica and cannot be used.

The process is most conveniently and expeditiously achieved by boiling in the acid in aqueous solution for a protracted period of time such as 24 hours but effects are observable after lesser times and longer heating is also feasible. The extent of leaching will, of course, determine the specific surface area achieved in the final product. The extent of leaching can be determined on the basis of X-ray evidence (disappearance of cordierite) and is also evidenced by the weight loss. Increase in specific surface area, otherwise sometimes referred to as adsorption surface area or "BET" surface area, is indirect evidence of the extent of leaching.

Catalysts are normally deposited on the supports prepared by the above procedure using the same methods as are conventional in the art for that purpose. The resulting catalytic shapes show excellent catalytic activity for the particular catalyst used.

The following examples further illustrate the process and products of the invention.

EXAMPLE 1

Cylindrical samples of corrugated ceramic 2.5 cm. in diameter by 7.5 cm. long having lengthwise passageways and 65% cordierite, 22% alumina and 13% mullite, some being present as a glassy bonding matrix of known weights were placed in a concentrated nitric acid bath and brought to boiling. A boiling chip may be used to minimize bumping and chipping of the samples. Samples were removed after various times, thoroughly dried and the weight loss and chemical surface area measured. Samples of this size are cut to a shorter length for certain tests hereinbelow. The procedure for measurement of specific surface area is that of S. Brunauer, P. H. Emmet and E. Teller "The Absorption of Gases in Multimolecular Layers," J. Am. Chem. Soc., Vol. 60, 309–16, (1938). The term "BET" surface area refers to these authors. The results are summarized in Table 1.

Table 1

| Soak Time (hrs.) | Weight loss (%) | Specific Surface Area (m²/gm) |
|---|---|---|
| 0 | — | 0.07 |
| 2 | 0.64 | 3.80 |
| 5 | 1.03 | 7.8 |
| 10 | 2.59 | 17.94 |
| 24 | 6.37 | 70.0 |
| 169 | 21.0 | N80.0 |

X-ray diffraction after a week (169 hrs.) shows absence of the cordierite (2MgO.2Al₂O₃.55:02) phase.

There were no dimensional changes during acid treatment and the weight loss did not account for the cordierite content of the starting structure. The boiling nitric acid solution used for the leaching treatment preferentially removed the magnesium and aluminum ions from the 3 dimensional cordierite structure leaving behind a stable silica skeleton full of submicroscopic holes and pores and having a high specific surface area. Analysis of the curves obtained by mercury porosimetry is taken to mean that the silica structure had undergone some atomic rearrangement, as evidenced by the presence of relatively large holes 1 to 50 microns when compared to the voids existing in the cylic ring structure of the cordierite (probably less than 10–15A.). A proportion of the free space is in the form of small pores, in the range of 0.001 to 0.1 microns. It appears that no silica has been chemically removed from the structure.

Comparable results are obtained when structures comprising from about 35% cordierite and others consisting essentially entirely of cordierite are treated in the process of the invention. When platinum is deposited on these structures as described hereinbelow, useful catalysts are obtained.

EXAMPLE 2

In order to determine the temperature stability of the acid treated cordierite structure of the invention, samples were processed as outlined in Example 1 using hydrochloric acid but removed after 10 hours leaching. Essentially similar results are obtained on material leached with any of the useful acids. The samples had a weight loss of about 3% leaving 86% of the original cordierite unattacked and a specific surface area of 20.8m²/gm. The effects of heating for 2 hours at elevated temperatures are shown in Table 2.

Table 2

| Temperature | Time | Specific Surface Area (m²/gm) |
|---|---|---|
| 0 | 0 | 20.8 |
| 800° C. | 2 hrs. | 15.8 |
| 900° C. | 2 hrs. | 9.1 |
| 1000° C. | 2 hrs. | 2.2 |

It will be seen that the chemically generated high specific surface area of the corrugated ceramic structure preferred by the process of the invention is stable up to about 800° C., above which temperature the area drops rapidly, possibly because of viscous flow or slumping of the silica network. However, the material heated at about 900° to 1000° C. has a many-fold greater specific surface area than the original cordierite structure and is useful as a support which has been preconditioned to a high temperature.

EXAMPLE 3

In order to demonstrate the effectiveness of the chemically generated high specific surface area monolithic ceramic catalyst supports of the invention an apparatus was constructed to produce a gas stream which simulated an automobile exhaust. The system is essentially a bank of bottled gases which discharge into a mixing chamber at accurately controlled rates to give a carefully controlled total gas flow. The gas mixture passes through a furnace containing a 2.5 cm. × 5.8 cm. sample of supported catalyst, through a condenser to remove water vapor and then through accurate analytical instruments which measure the CO and total hydrocarbon concentration in the gas continuously. The CO concentration is measured by means of non-dispersive infrared absorption and the hydrocarbon concentration is measured with a flame ionization detector. The input test gas conditions are:

| Total gas flow (425 l/hr.) Gas Composition: | |
|---|---|
| $N_2$ | 86.5% |
| CO | 1.0% |
| $C_3H_6$ | 0.025% |
| $O_2$ | 2.5 |
| $H_2O$ | 10.0% |

The supported catalyst is a 25.4 mm. (1 inch) diameter cylinder 58.3 mm. (2.3 inches) long, so that under these conditions of flow there is a space velocity, at standard temperature and pressure, of 15,000 vol/vol per hour. This sample is cut from a longer support as noted above. By using even shorter supports, i.e., less than 15 mm., the space velocity is greatly increased so that space velocities in the range from 15,000 to 200,000 vol/vol/hr. are readily attained. Space velocities in automobile exhausts are of this range of magnitude. The supported catalyst sample being tested is preconditioned in the furnace at 600° C. for 30 minutes in flowing dry nitrogen.

In performing a test, the furnace power is turned off after the preconditioning, the test gases are introduced into the chamber and the percent of CO and hydrocarbon (HC) in the exit gas stream are measured and continuously recorded as a function of temperature of the catalyst support which is gradually allowed to cool from 600° C. to about 200° C. or lower. Different structures and catalysts are compared by observation of the temperature at which 50% conversion of CO and hydrocarbon occurs. There is considerable variation in these temperatures for catalysts prepared by different methods as illustrated by the data of Table 3.

Table 3

| Run | Catalyst | Temperature for (°C) 50% conversion | |
|---|---|---|---|
| | | CO | Hydrocarbon |
| A | Commercial Pt on support* | 263 | 271 |
| B | Commercial Pt on support* | 213 | 210 |
| C | Control: Pt on support** | 327 | 349 |
| D | Acid treated 2 hrs., with Pt** | 263 | — |
| E | Acid treated 5 hrs., with Pt** | 238 | — |
| F | Acid treated 10 hrs., with Pt** | 232 | — |
| G | Acid treated 24 hrs., with Pt** | 260 | — |

*These are the supports of cordierite, alumina and mullite used in Example 1 and coated with high surface area alumina.
**The same support, no alumina coating and Pt deposited from a solution of about 2% chloroplatinic acid and about 1% aluminum chloride.

The control (run C of Table 3) is of interest as showing the relatively lower effectiveness of a ceramic structure which had not been subjected to the process of the invention as compared to structures having coatings of high surface area alumina (Runs A and B) and also to samples prepared from structures treated by the process of the invention, namely, Runs D, E, F and G, for various times. It will be seen that the treated samples used in the latter runs provide temperatures of 50% conversion of CO considerably better than the untreated control (Run C) and as good as commercial materials of Run A and not, in some cases, much inferior to the other commercial material of Run B. These results were obtained using as the method for deposition of platinum, the simple process of wetting the support with a chloroplatinic acid solution and precipitation of Pt with $H_2S$ to give after firing approximately 0.4 wt.% Pt on the sample such that a sample of about 30 cc. volume contains about 85 to 95 mgm. Pt.

EXAMPLE 4

A number of samples of the ceramic used above are treated by boiling for 24 hours in each of a series of acid solutions and then platinum catalyst is deposited using a solution of about 2% chloroplatinic acid and 1% aluminum chloride. In Runs H', I', J', and K', the impregnated sample is treated with hydrogen sulfide to precipitate the platinum.

In Runs H, I, J and K, the $H_2S$ is omitted. In each case the moisture is expelled and the ceramic fired to 600°

C. as described above. Data in temperatures (°C) for 50% conversion are compared in Table 4.

TABLE 4

| Acid | Concentration (wt.%) | Run | Without H$_2$S 50% Conversion | | Run | With H$_2$S 50% Conversion | |
|---|---|---|---|---|---|---|---|
| | | | CO | HC | | CO | HC |
| C$_2$H$_2$O$_4$ | 30 | H | 293 | 321 | H' | 316 | 343 |
| HNO$_3$ | 70.5 | I | 304 | 471 | I' | 282 | 304 |
| HNO$_3$ | 41.4 | J | 352 | 540 | J' | 280 | 297 |
| H$_3$PO$_4$ | 85 | K | 338 | 354 | K' | 299 | 321 |

EXAMPLE 5

One useful catalyst support is one which is boiled with 70% HNO$_3$ for about five hours. Samples coated with platinum from a solution of chloroplatinic acid and aluminum chloride as above, then treated with H$_2$S gas and fired for two hours at 600° C. give 50% conversion of CO and HC under the above test conditions at 235° and 246° C. respectively. Conversions of about 90% are reached at about 370° C.

EXAMPLE 6

Ceramic pieces leached for five hours in 70% HNO$_3$ as in Example 5 are coated with high surface active alumina in the form of a 10% dispersion and then fired at 500° C. Platinum catalyst is deposited as in that example and the samples are found to provide excellent conversions of carbon monoxide, namely 50% at about 200° to 210° C.

EXAMPLE 7

Catalyst supports of the invention are prepared by leaching the corrugated ceramic cylinders used above in Example 1 with concentrated (97.1%) sulfuric acid, trichloroacetic acid (57.6 wt.% in water) and benzenedisulfonic acid (49 wt.% in water) followed by washing and drying. Platinum catalyst is deposited on the supports as described above using H$_2$S treatment only in the case of the two organic acids. Conversions of hydrocarbon and CO to carbon dioxide are variously up to about ⅔ to about 5/6 of theoretical with 50% conversions at temperatures of the order of about 290° to 380° C.

Other ceramics comprising cordierite as the only acid leachable phase are also subjected to the process of the invention to provide supports for deposition of catalysts such as the platinum described in the above examples or copper chromite or vanadium catalysts. The catalysts may be deposited directly on the leached support with high specific surface area or a supplemental high surface area coating as of alumina may be applied to the support before or concurrently with the catalyst.

What is claimed is:

1. Process for the production of a high specific surface area catalyst support which comprises subjecting a fired ceramic comprising cordierite and of desired geometrical shape and structure to the leaching action of an aqueous acid; for a time sufficient to remove at least a portion of the magnesium and aluminum combined in the cordierite of said fired ceramic followed by heating to a temperature no higher than about 1,000° C.; said acid being characterized by having a dissociation constant in water of at least $1 \times 10^{-5}$ and forming soluble magnesium and aluminum salts.

2. The process according to claim 1 wherein the fired ceramic comprises from 30% to 100% cordierite.

3. The process according to claim 2 wherein the fired ceramic has from 25 to 50% of open space.

4. The process according to claim 3 wherein nitric acid is employed as the acid.

5. The process according to claim 4 wherein leaching is effected at the boiling point of concentrated nitric acid for from 2 to 24 hours.

6. The process according to claim 4 wherein a corrugated ceramic structure having about 30 to 40% open space by volume and comprising about 65 to 75% cordierite, 15 to 25% alumina and 10 to 15% mullite is boiled for from 5 to 24 hours in aqueous nitric acid containing about 40 to about 75 wt.% HNO$_3$ and thereafter after washing, is fired at a temperature below 800° C.

7. A high specific surface area rigid catalyst support having thin sectioned members and relatively large geometrical surface area comprising a silica phase of porous structure characterized by a relative abundance of relatively large holes of about 1 to 50 microns and a substantial volume of very small pores of about 0.001 to 0.1 microns said silica phase being pseudomorphous after cordierite.

8. A high specific surface area rigid catalyst support according to claim 7 additionally comprising an adherent coating of high surface area alumina distributed over at least part of the geometrical surface thereof.

9. A rigid catalyst comprising a catalyst support according to claim 7 and a catalyst distributed over said support.

10. A rigid catalyst according to claim 9 wherein the catalyst is a noble metal.

11. A rigid catalyst according to claim 10 wherein the noble metal is platinum.

12. A rigid catalyst according to claim 11 wherein the support is a corrugated ceramic structure comprising about 25 to 50% of open space and comprising, in addition to the silica phase, also mullite and alumina.

* * * * *

UNITED STATES PATENT OFFICE
CERTIFICATE OF CORRECTION

Patent No. 3,856,706           Dated December 24, 1974

Inventor(s) Henry F. Harrison and Moses P. Davis

It is certified that error appears in the above-identified patent and that said Letters Patent are hereby corrected as shown below:

Column 8, line 6, "acid; for" should read — acid for —.
Column 8, line 28, "thereafter after" should read — thereafter, after —.

Signed and sealed this 18th day of March 1975.

(SEAL)
Attest:

RUTH C. MASON
Attesting Officer

C. MARSHALL DANN
Commissioner of Patents
and Trademarks